United States Patent [19]

Miskinis

[11] Patent Number: 4,582,444

[45] Date of Patent: Apr. 15, 1986

[54] LOCKING AND UNLOCKING LABORATORY JOINTS

[76] Inventor: Robert J. Miskinis, 10020 Prospect Ave. A-15, Santee, Calif. 92071

[21] Appl. No.: 691,841

[22] Filed: Jan. 16, 1985

[51] Int. Cl.$^4$ ............................ B25G 3/00; F16D 1/00
[52] U.S. Cl. ...................................... 403/16; 403/321; 403/342; 285/387; 285/DIG. 12
[58] Field of Search .................. 403/16, 342, 21, 321; 285/386, 387, 388, DIG. 12

[56] References Cited

FOREIGN PATENT DOCUMENTS

| 111995 | 12/1917 | United Kingdom | ................... 403/16 |
| 631543 | 11/1949 | United Kingdom | ................ 403/342 |
| 915258 | 1/1963 | United Kingdom | ....... 285/DIG. 12 |

Primary Examiner—Andrew V. Kundrat
Attorney, Agent, or Firm—George J. Rubens

[57] ABSTRACT

A laboratory joint is provided for a pair of male and female members having matable tapered ends which are connected together by a sleeve which can lock the members together to prevent accidental separation, which sleeve is capable of separating the assembled members when desired in a safe and expedient manner.

11 Claims, 5 Drawing Figures

LOCKING AND UNLOCKING LABORATORY JOINTS

BACKGROUND OF THE INVENTION

This invention relates to laboratory joints, and more particularly to such joints that can be secured together by a sleeve to prevent accidental separation when in a mated position, and which joints can be separated by the sleeve from their mated position in safe and expedient manner.

There is a frequent need for laboratory technicians to join together various types of laboratory tubing, some of which are commonly called "joints" in assembling experiments. These joints are usually made of glass tubing with tapered ground surfaces to be mated together in a sealed connection. These ground surfaces when pushed together form a tight fit which have a tendency to stick together, and frequently become frozen by the deposition of chemicals. Such frozen joints are difficult to separate without breakage and possible injury from broken glass, as well as possible damage to the laboratory setup of which the joint is integrally connected.

In some instances it is desirable that the laboratory joints be locked when secured together, especially when used in a pressurized environment to prevent accidental separation. Numerous means have been employed in the prior art for this purpose, such as spring loaded pinch type clamps, O-rings etc. Other types of locking means includes the use of various types of washers and gaskets which amounts to a connection requiring several more components that need to be stocked in inventory and bothersome for the technician to assemble.

SUMMARY OF THE INVENTION

A laboratory joint connection is provided that will lock together in a positive manner a pair of male and female mated tapered members, which can be easily unlocked in a simple and safe manner. This result is achieved by connecting the members together by a sleeve having means for attachment to each tapered end of the male and female members, and when the sleeve is rotated in one direction will apply an axial force to maintain such members together in a mated condition to prevent accidental separation, and when the sleeve is rotated in the other direction will apply an axial force in the opposite direction forceably to separate the tapered mated joints in a safe and expedient manner.

OBJECTS OF THE INVENTION

A principal object of this invention is to provide a laboratory joint connection that is capable of being locked together in mated position, and of being separable from the mated position in a safe and expedient manner.

Another important object is to provide a sleeve capable of being connected to a female joint member having a threaded end and to a male member having a pair of spaced annular lips whereby the members may be locked together or separated by a single sleeve member.

Still another object is to provide such a laboratory joint conection with a minimum of parts to simplify stocking of inventory as well as assembly of the joint connection.

DETAILED DESCRIPTION OF THE INVENTION

Figure 1:
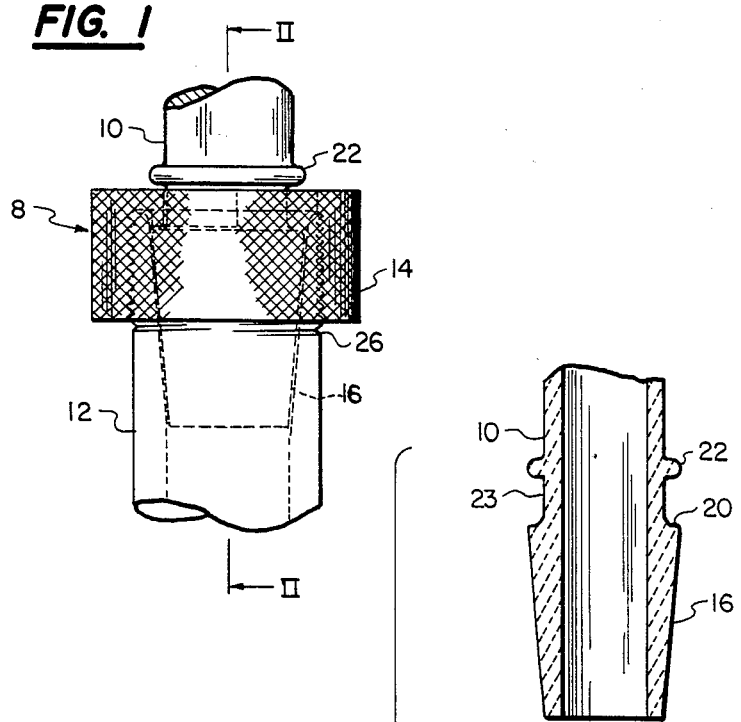
FIG. 1 is an assembled view of a male and female joint being secured together by a novel sleeve.

Referring to the drawing where like reference numerals refer to similar parts throughout the figures, there is shown in FIG. 1 an assembled joint connectin 8 comprising a male and female member 10 and 12, respectively, connected together in a mated condition by a novel sleeve 14. Members 10 and 12 are illustrated as laboratory tubular joints, commonly used by glassmakers for various laboratory combinations, and for the most part these joints are made of glass. Sleeve 14 is preferably made of a suitable plastic material.

Figure 2:
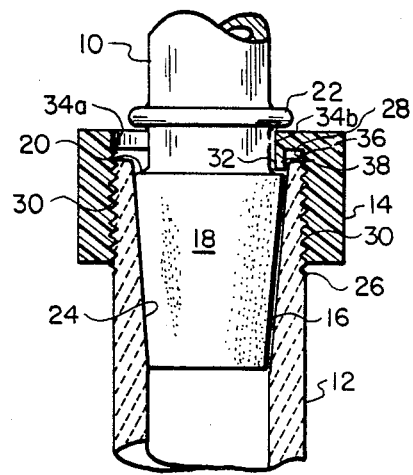
FIG. 2 is a longitudinal section veiw of the assembled connection of FIG. 1 taken along line II—II.
Figure 3:
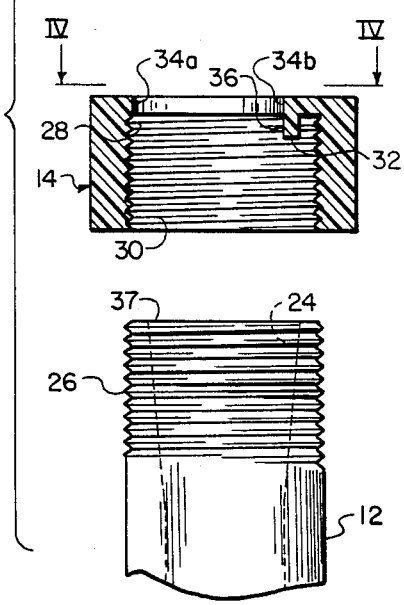
FIG. 3 is an exploded view of the assembled connection of FIG. 1.
Figure 4:
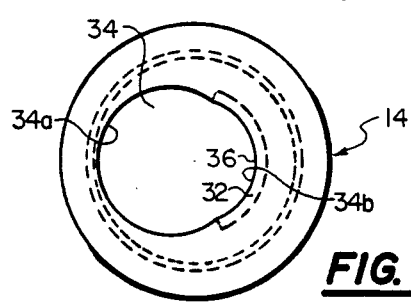
FIG. 4 is a top plan view of the sleeve member taken along line IV—IV of FIG. 3.

As best shown in FIGS. 2 and 3, male member 10 terminates in a tapered end 16, the exterior surface 18 of which is usually ground to provide a good sealable contact. The larger end of tapered surface 18 terminates in an annular lip 20 which is longitudinally spaced from a second annular lip 22 formed on male member 10 forming a neck portion 23 between the lips. The purpose of lips 20 and 22 and their longitudinal spacing function in a manner to be described.

One end of female member 12 is provided with a tapered inner surface 24 complementary to male exterior surface 18 and also ground. The end of female member 12 adjacent tapered surface 24 is threaded at 26 for a purpose to be described.

An important feature of this invention is to provide a unique sleeve having a dual purpose, firstly of connecting the male and female members together in a mated and sealable position and locked in that position; and secondly, of separating said members from their mated position in a safe and expedient manner. Sleeve 14 has a longitudinal bore 28 which is threaded at 30 at one end for engaging threads 26 on female member 12, as best shown in FIG. 2. The other end of sleeve 14 is formed with a partial transverse wall 32 having a through opening 34 through which male member 10 can be threaded through the sleeve into the female member.

In one modification, opening 34 of sleeve 14 is formed of two intersecting circular openings 34a and 34b, opening 34a being of a diameter greater than the diameter of lip 20 to allow passage therethrough of male tapered end 16. Opening 34b in end wall 32 has substantially the same diameter of male neck 23 so that wall 32 provides a bearing surface against lip 20. The center of opening 34b is concentric about the longitudinal axis of sleeve bore 28, whereas the center of opening 34a is displaced from the longitudinal axis of sleeve bore 28 for a reason presently to be described.

A shoulder 36 is provided on wall 32 around the periphery of opening 34b, which shoulder projects longitudinally inwardly the sleeve. The width of shoulder 36 is no wider than lip 20 against which it is designed to bear, so that should the fit between the tapered surfaces of the members be so loose that lip 20 extends below the mouth 37 of the female member, that sleeve 14 will still bear against the male member to insure a tight fit wih the female member. It should be noted that shoulder 36 is sufficiently spaced at 38 from the side wall of the sleeve to receive the end of female member 12. The longitudinal spacing of neck 23 between male member lips 20 and 22 is larger than the longitudinal length of shoulder 36 plus the thickness of end wall 32 to house the shoulder when the sleeve is mounted over the male member.

Figure 5:
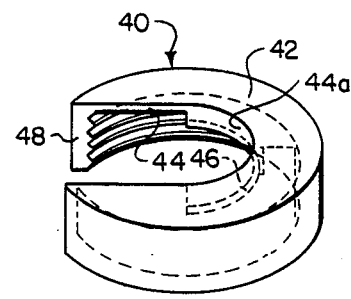
FIG. 5 is a perspective top view of a modified sleeve member.

A modified sleeve 40 is shown in FIG. 5 which enables the sleeve to be laterally mounted on male member 10, instead of being threadedly mounted as is necessary with sleeve 14 of FIGS. 1-4. In sleeve 40 of FIG. 5, an end wall 42 is also provided with an opening 44 terminating in a circular end 44a, the radius of which is similar to that of opening 34b of sleeve 14. The end wall 42 adjacent circular end 44a can be provided with a shoulder 46, similar to shoulder 36 of sleeve 14 and for the same purpose.

Opening 44 in end wall 42 is coextensive with a longitudinal slot 48 in the side wall of sleeve 40 to enable lateral passage of male member 10 through slot 48 of the sleeve so that shoulder 46 can be positioned between lips 20 and 22 of male member 10.

The assembly and operation of the novel connection is as follows. In the modification of FIGS. 1-4, male member is first threaded through larger opening 34a of sleeve 14 until sleeve shoulder 36 is adjacent male member neck 23 at which time male member 10 can be moved laterally into smaller opening 34b with shoulder 36 confined between male member lips 20 and 22. In this position, male member 10 is longitudinally aligned with female member 12 and can be seated therein.

Rotation of sleeve 14 in one direction on female member 12 causes shoulder 36 to bear against lip 20 forcing the male member into the female member with their respective tapered ground surfaces 16 and 26 into a tight and sealing engagement. The members are thereby secured and locked in mating engagement preventing accidental separation. It should be noted that if there exits a loose fit between the tapered surfaces such that lip 20 extends below female member mouth 37, shoulder 36 can also extend into the mouth 37 to bear against lip 20 ensuring a tight fit between the tapered surfaces.

To safely and quickly separate the assembled connection by overcoming the friction between the ground surfaces, and other friction that may be caused by chemical deposits between the surfaces etc., sleeve 14 is rotated on female member 12 in the opposite direction until shoulder 36 bears against lip 22 at which time the rotational force is translated into an axial force between the members to separate them. Thus, the novel construction of sleeves 14 and 40 enable the male and female members to be locked together, and be quickly and safely separated when necessary.

Accordingly, a novel connection is provided which consists of only three components, namely, a female member, a male member, and an interconnecting sleeve member which performs a dual function of locking the members together in their mated position, and when it is necessary to separate the members in a safe and expedient manner. Minimizing the number of parts of a laboratory connection is an important consideration in that it improves housekeeping chores in the laboratory where inventory control is a significant problem, both to the stock manager as well as to the laboratory worker in the time spent looking for the parts to make a connection.

I claim:

1. The combination of a glass male and female ended tubular member having corresponding tapered mating surfaces, said tapered surfaces dimensioned to be nested together in a sealable connection, said female member having exterior threads adjacent its tapered surface, and said male member having a pair of longitudinally spaced annular lips adjacent its tapered surface, a plastic sleeve having a longitudinal bore internally threaded at one end for engaging the threads on the female member, said sleeve having a laterally inward extending shoulder at another end adapted to be positioned between said pair of spaced annular lips on the male member, whereby rotation of the sleeve on the female member in one direction will cause one lateral side of the sleeve shoulder to engage one of said lips to secure the surfaces of said members in sealed mated engagement, and rotation of the sleeve in the opposite direction will cause the other lateral side of the shoulder to engage the other lip to separate forcibly the sealed surfaces of the members from their mated positions.

2. The combination of claim 1 wherein said shoulder on the sleeve is formed on an end wall of the sleeve.

3. The combination of claim 1 wherein said one lateral side of the sleeve shouler extends radially inwardly the sleeve and parallel to the bore axis to ensure the male tapered surface is in engagement with the female tapered surface.

4. The combination of claim 1 wherein said sleeve is partially longitudinally slotted along its side wall to enable the sleeve to be inserted around the members from a lateral position.

5. The combination of claim 1 wherein said end wall of the sleeve is provided with a pair of intersecting circular through openings, the diameter of one of said openings being larger than diameter of the annular lips to allow passage of the male member, and the diameter of the other opening being smaller than the diameter of the lips to be captured between the lips when the sleeve is rotated in either direction.

6. The combination of claim 5 wherein said end wall of the sleeve is provided with said shoulder which is formed around the periphery of the smaller opening.

7. The combination of claim 6 wherein the smaller diameter opening is concentric with the longitudinal axis of the sleeve.

8. The combination of claim 7 wherein the width of said shoulder is no wider than the width of the lip adjacent the tapered surface of the male member to enable said shoulder to extend into the female member to ensure contacting engagement between said tapered surfaces when the sleeve is threaded on the female member.

9. A sleeve for locking and unlocking a mating male and female member having tapered ends, one of said members having threads adjacent one end, and the other member having a pair of longitudinally spaced annular lips, said sleeve having a longitudinal bore threaded at one end to engage the threads on said member, the other end of the sleeve having an end wall formed with a through opening of a size to receive said member having the annular lips, said end wall having a shoulder adjacent said opening which extends longitudinally within said sleeve for engaging one of said lips.

10. The sleeve of claim 9 wherein said opening leads to a slot extending longitudinally through the side wall of the sleeve.

11. The sleeve of claim 9 wherein said opening consists of a pair of intersecting circular openings, one opening being larger in diameter than the diameter of the lips of said members and the other opening being smaller than the diameter of the annular lips whereby the end wall can be positioned between, and bear against said lips when the members are longitudinally aligned.

* * * * *